July 21, 1925.　　　　　　　　　　　　　　1,546,702
E. G. BAILEY
SPECIFIC GRAVITY RECORDER
Filed Aug. 21, 1923
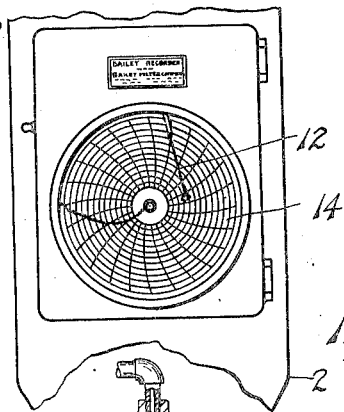
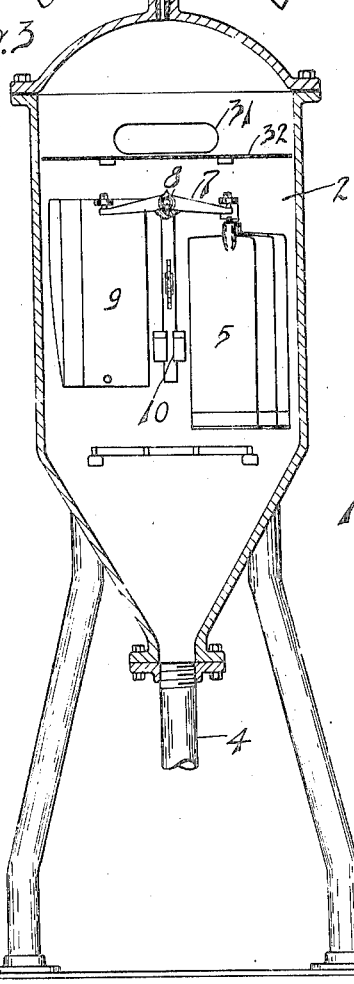
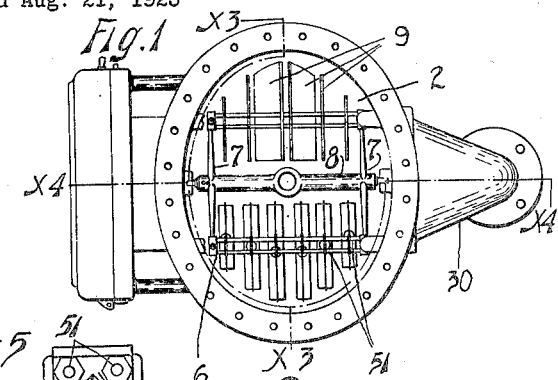
Inventor
By Ervin G. Bailey
Jos. P. Livermore
Attorney Patented July 21, 1925.

1,546,702

UNITED STATES PATENT OFFICE.

ERVIN G. BAILEY, OF CLEVELAND HEIGHTS, OHIO, ASSIGNOR TO BAILEY METER COMPANY, OF BOSTON, MASSACHUSETTS, A CORPORATION OF MASSACHUSETTS.

SPECIFIC-GRAVITY RECORDER.

Application filed August 21, 1923. Serial No. 658,593.

*To all whom it may concern:*

Be it known that I, ERVIN G. BAILEY, a citizen of the United States, and resident of Cleveland Heights, in the county of Cuyahoga and State of Ohio, have invented an Improvement in Specific-Gravity Recorders, of which the following description, in connection with the accompanying drawing, is a specification, like reference characters on the drawing designating like parts.

This invention relates to an apparatus for indicating, with or without also recording, the specific gravity of a liquid, and especially for keeping a record of the specific gravity of a flowing liquid, such for example as oil, or various solutions in which the degree of concentration can be known from a knowledge of the specific gravity of the liquid.

As is well known, the density of a liquid varies with the temperature, so that for a correct knowledge of the specific gravity of the part of a flowing liquid at any moment passing a given point from known or observed value of its density, at the same moment, the temperature must also be known, and the proper correction made, unless care is taken to keep the temperature constant during the period of observation or of recording, and the same at all periods of investigation.

The main object of the present invention is to produce an apparatus or instrument adapted for use in a plant for handling or producing liquids, which instrument will at all times indicate, and preferably also make a permanent record of, the specific gravity of the liquid, the whole or a representative fraction of which may flow continuously through the apparatus while under any desired pressure and at any temperature within the limits encountered in the usual handling or treatment, and the invention consists in part in the novel construction of a float or displacer and associated parts by which the buoyant effort of the liquid on said displacer is caused to indicate and to make a timed record of the specific gravity of the liquid at every moment in its flow, unaffected by variation in the actual density of the liquid due to variation in temperature or departure from the standard temperature at which the ratio of its density to that of the standard substance is its specific gravity.

The nature of the apparatus will be best understood from a consideration of the specific example shown in the accompanying drawings, in which:—

Fig. 1 is a plan view of an apparatus embodying this invention for indicating and recording the specific gravity of a liquid, the whole, or a representative part of which is caused to flow through the apparatus, the top closure of the receptacle through which the liquid flows being removed to show the parts contained in said receptacle;

Fig. 2 a front elevation thereof;

Fig. 3 a sectional elevation on line $X^3$ of Fig. 1;

Fig. 4 a sectional elevation on line $X^4$ of Fig. 1; and

Figs. 5, 6, and 7 are enlarged details to be referred to.

The principal working parts of the apparatus are contained in a main casing or shell 2, into which the liquid, the specific gravity of which is to be indicated, enters through a pipe 3, and from which it is delivered through a pipe 4, (see Fig. 4) the flow commonly being continuous so that all parts of the liquid are successively subjected to the action of the apparatus, which may for example be used in connection with an oil pipe line to keep a record of variations in the specific gravity of the oil in a period of flow, or may be employed in connection with a solution, to record the specific gravity of all parts and thus afford a basis for ascertaining the strength, or average strength of the solution, or the percentage strength of a material, such as sugar, carried in the solution during a given period of flow.

The portion of the apparatus which is directly responsive to the specific gravity of the liquid at any time in the receptacle 2, comprises a submerged body moveable in response to the buoyant effect of the liquid, which will be hereinafter called the displacer, the construction of which will be hereinafter described.

The said displacer 5, is pivotally connected at 6 with one arm of a lever or rocking frame 7 supported on a fulcrum shaft 8 and having on its other arm a counterbalancing weight 9 made to just counterbalance the said displacer when both the displacer and the counterbalance 9 are submerged in liquid of normal, or average, or standard specific gravity, relative to which the actual specific gravity in all parts of the liquid passing through the casing 2 is to be indicated and recorded.

The displacer 5, while having the same preponderance of weight over the buoyant effort of the normal or standard liquid as the counterbalance 9, or being of proper proportional weight to balance the same if the lever arms of the balance lever 7 are unequal, is of much greater volume, due to the construction which will be hereinafter explained, and the said displacer thus displaces a much larger volume of the surrounding liquid than does the counterweight, so that the actual buoyant effort of the liquid is much greater on the displacer than on the counterweight.

Thus assuming that the displacer and weight just balance one another when submerged in liquid of normal specific gravity, if the specific gravity of the liquid should increase, that is, if the normal liquid flowing out from the casing 2 should be replaced by inflowing liquid of higher specific gravity, the buoyant effort on both displacer and counterweight would increase, and, owing to the greater volume of the displacer would cause it to rise, and conversely decrease in the specific gravity of the liquid in the casing 2 would cause the displacer to descend or sink deeper in the liquid.

In order to provide for a variable and progressively increasing resistance to such movement of the displacer, so that it will be brought to rest after a greater or less movement corresponding to a greater or less increase or decrease in specific gravity of the liquid, the fulcrum shaft 8 of the displacer 5 and weight 9 is provided with a pendulum 10, which may be so affixed to said shaft as to hang in vertical position when the displacer is in its lowest position, assuming that the minimum specific gravity is taken as the basis from which variations are to be indicated, or which might be vertical when the displacer is at some intermediate position, in case variations above and below the specific gravity represented by such intermediate position of the float are to be indicated and recorded. In practice it is generally preferable to have the pendulum vertical when the specific gravity is at its average value.

Assuming that the pendulum starts from vertical position, any upward or downward movement of the displacer will swing it away from vertical position, and its leverage or moment will increase as it moves away from the vertical, and consequently the force of gravity on the pendulum will exert progressively increasing resistance to the upward or downward movement of the displacer, which will thus come to rest at a higher point for a greater, than it will for a smaller increase in the specific gravity of the liquid, and the movement of the displacer, or of the pendulum itself, or of a pointer or indicator, such as the pen, or marker 12, Fig. 2, deriving its movement from that of the displacer, will afford an indication of the amount of movement of the displacer and consequently an indication of the departure of the liquid from the chosen normal or average specific gravity, the scale over which the pointer or indicator works being properly graduated to make the indications correspond to the specific gravity of the liquid at the moment of observation.

As shown in the detail Fig. 6, an adjusting screw 100 for the pendulum bob is provided to facilitate accurate adjustment of the length of the pendulum according to the character of the liquid and to the graduation of the scale on which the specific gravity is indicated.

The apparatus without further structural characteristics than thus far described would serve as an indicator to show the actual density of liquid at any time, and if the movement of the displacer is caused to produce a corresponding movement of a pen or marker such as 12, and the latter operates in conjunction with a traveling recording surface 14, operated by clock work indicated at 140, Fig. 4, as is usual in making continuous records of some variable condition, the apparatus would make a record of all of the variations in density of the liquid during a period of flow through the casing 2 of the apparatus, as well as afford at any given moment an indication of the density of the liquid then in the said casing.

As thus far described, the apparatus would not, however, show the variations in actual specific gravity, unless the liquid were maintained under standard conditions throughout the period in which the record is made, for if the temperature of the liquid changed, i. e. departed from the standard, there would be a change in volume, and a corresponding change in the actual density of the liquid, while its specific gravity remains unchanged.

The construction of the parts thus far mentioned, especially that of the displacer, is, in accordance with this invention, adapted automatically to compensate for changes in density of the liquid due to changes in temperature, or to eliminate any effect on the indication or reading due to change in volume of the liquid by the action of heat, as well as to guard against certain other factors which might otherwise affect the indicator and recording pen, and introduce errors into the record.

With this end in view the displacer 5 comprises a plurality of flexible-walled, liquid filled, chambers 50 (see Fig. 7) which are supported on a pair of cross-bars 51, secured to end pieces 52 each of which is itself supported by a cup and cone pivot 53 at the ends of the arms of the levers pertaining to the rocking frame 7, as shown in Fig. 5.

As shown in Fig. 7 the chambers 50 have each a tubular neck 54 through which the liquid may be introduced, the filling opening being provided with a removeable stopper 55 having a lug 56 with openings 57 for the supporting bars 51.

The displacer chambers 50 are filled with a liquid which is the same, or has the same coefficient of expansion by heat, as the normal, or average liquid to be handled, and consequently when the surrounding liquid is exactly normal the contained liquid has no effect on the balance of the displacer 5 and counterweight 9 as its own weight exactly counterbalances the buoyant effect of the equal volume of liquid displaced by it.

Assuming that the arms of the balance lever 7 are equal and that the chambers 50 and counterweight 9 are of the same material, there should be the same amount of material in each to effect a perfect balance both as to weight and as to buoyant effect, as the volume of liquid displaced by the chambers 50 (that is, by their walls, apart from that displaced by their liquid contents), would then be the same as that displaced by the counterweight 9.

The displacer chambers 50 are thin or relatively very small in one dimension, having extensive flat, or approximately flat, side walls, shown in this instance as having their marginal parts at top and bottom inlined or bevelled, and the edges of one side wall united with the edges of the other with a tight joint so that the chamber presents a sharp or V-shaped edge at top and bottom between the broad side walls.

As thus constructed the walls of the chamber are easily bulged or forced outward by internal pressure and thus accommodate any expansion of the contained liquid due to a rise in temperture, and as the liquid completely fills and is tightly sealed in the chamber, the walls will be forced inward by external pressure if the liquid contracts by a fall in temperature, with the result that the displacement volume of the displacer 5 (that is, of the entire series of chambers and liquid contained therein) is correspondingly increased or decreased.

The counterweight 9 in the preferred construction is composed of a number of plates of the same weight and material as the walls of the chamber 50 and is supported from the balance lever or rocking frame 7 in a similar manner, and said counterweight will thus completely balance the walls of the displacer chambers both as to weight and as to buoyant effort of the liquid in which both are submerged, so that in effect only the liquid contained in the chambers is the displacer the buoyant effort on which of the liquid in the receptacle is weighed and indicated.

The buoyant effort of the liquid on the counterbalanced displacer thus efforts a true measure of the relative densities of the surrounding liquid and of the submerged liquid contained in the displacer chambers which relation is the same under all conditions of temperature, including of course the standard temperature at which the relative density is the same as the relative specific gravity.

In order to provide for transmitting movement to the indicator 12 outside of the casing 2, corresponding to the rise or descent of the displacer 5 to the level corresponding to the specific gravity of the liquid at each moment in the casing, without having any moving part extend through the wall of the casing and thus involve resistance to the movement of the displacer, the rod of the pendulum 10 has affixed to it a magnet 15 which can swing with the pendulum in an opening 20 in the wall of the casing 2, which opening is tightly covered and sealed by a suitably shaped cover plate 21 of non-magnetic material.

The indicator 12 is an arm or pointer connected with a shaft 17 supported on a knife-edge or frictionless fulcrum outside of the casing 2 in line with the fulcrum of the displacer support within the casing, and said shaft 17, has a depending arm upon which is secured an armature 16 just outside of the closure 21 and opposite to the poles of the magnet 15.

The shaft 17 is also provided with a counterweight 18 which is shown as adjustable toward and from the axis of movement of the pointer and armature, and should be adjusted so as practically to balance them, thus rendering them free to turn about the axis in response to a minute force.

Thus the attraction of the magnet 15 for the armature 16 exerted through the non-magnetic closure 21 will keep the armature directly opposite to the magnet and will cause the pointer 12 to swing in time and proportion with the movement of the displacer 5, while a pen or tracer at the free end of pointer will make a record on the clock driven record sheet 14 in the usual well known manner.

By having a displacer composed of a plurality of relatively thin chambers the liquid contained therein is very quickly responsive to changes in temperature of the surrounding liquid and thus affords a very close approximation to accuracy, even if the temperature of the surrounding liquid varies from point to point in the current flowing through the apparatus.

As further contributing to the accuracy of the apparatus, it is to be observed that the inlet pipe 3 of the liquid being handled is made flaring as it approaches the upper portion of the chamber, as indicated at 30 in Fig. 1, and opens into the chamber through an elongated horizontal port, as shown at 31 in Fig. 3, thus distributing the liquid with a relatively gentle horizontal flow into the upper portion of the chamber from which it descends through the portion containing the displacer and counterweight.

A screen or foraminous plate 32 is interposed between the portion of the chamber where the liquid enters, and the portion containing the displacer and working parts, and causes the liquid to descend with a relatively slow movement through the portion of the casing in which the working parts are contained without eddying and with substantially uniform velocity throughout the cross section of the casing.

By having the counterweight composed of a number of plates similar to the walls of the displacer chamber 50, any frictional drag of the downflowing liquid on the one is counteracted by that on the other.

Any effect due to change of temperature in the material of the displacer and counterbalance is completely counterbalanced and in order to counteract any effect that the contraction of the area of the passage for down flowing liquid past the displacer chambers might have on the displacer, the plates of the counterbalance, or some of them, may be suspended in a position somewhat inclined to the vertical as shown at 90, Fig. 2, to produce a resistance to the vertical flow of the liquid past them equivalent to that of the chambers of the displacer.

Furthermore, by having the displacer composed of relatively thin, sharp-edged chambers, and the counterweight of similar plates, there is no opportunity for deposit of fine sediment from the liquid upon these components, as might happen, and would introduce an element of error if these parts presented horizontal surfaces of considerable extent to the vertically flowing liquid.

As shown in Figs. 3 and 4, the lower portion of the chamber 2, is conical, or tapers downward so as to practically preclude any accumulation of sediment therein as the velocity of the liquid increases gradually as it passes from below the level of the displacer to where it enters the outlet pipe 4.

Claims:—

1. The combination with a receptacle having provision for flow of liquid therethrough, of a hollow, liquid filled displacer and a counterbalancing weight, and supporting lever for said displacer and weight, the said displacer and weight being both submerged in the liquid in the receptacle when in operation, and said weight counterbalancing the walls of the hollow displacer, leaving the liquid contained therein as the effective displacer subject to the unbalanced buoyant effort of the liquid in the receptacle.

2. A specific gravity indicator for liquids, comprising a receptacle for the liquid the specific gravity of which is to be indicated, combined with a wholly submerged hollow displacer filled with a liquid having the same co-efficient of expansion for temperature as the liquid in the receptacle, and a submerged counterbalancing weight and lever connecting the same with the displacer, said weight being of material of the same character as the walls of the displacer and counterbalancing the buoyant effort of the liquid thereon at all temperatures.

3. The combination with a receptacle having provision for flow of liquid therethrough, with a displacer composed of a plurality of flexible walled chambers filled with liquid, and a counterbalancing weight for the walls of said chambers, and lever connecting said displacer and weight, which are adapted to be wholly submerged in the liquid in the receptacle, the buoyant effort of the liquid in the receptacle on the liquid in the displacer thus affording a measure of the relative specific gravities of said liquids.

4. A specific gravity indicator for a flowing liquid comprising a receptacle having inlet and outlet ports at top and bottom for the liquid the specific gravity of which is to be indicated, combined with a displacer and counterweight therefor, and a horizontal connecting lever for said counterweight and displacer all located in the receptacle between the inlet and outlet thereof, whereby the tendency of the impulse due to the flow of the liquid vertically through the receptacle to move the displacer and counterweight is balanced and neutralized.

5. A specific gravity indicator for a flowing liquid, comprising a receptacle having near its top an inlet for the liquid the specific gravity of which is to be indicated, and an outlet from the lower portion, combined with a displacer composed of a plurality of relatively thin hollow liquid filled chambers, and a counterbalancing weight composed of plates corresponding to the walls of said chambers, and a lever connecting said weight and displacer and together therewith being contained in the receptacle below the inlet thereto.

6. A specific gravity indicator for a flowing liquid, comprising a receptacle having near its top, an inlet for the liquid the specific gravity of which is to be indicated and an outlet from the lower portion thereof, combined with a displacer composed of a plurality of flexible walled chambers each composed of two parallel walls, each having its marginal parts inclined and united to the margin of the other thus forming a thin flat chamber with V-shaped edges, and a counterbalancing weight composed of a series of plates substantially equivalent in weight and in resistance to the flow of liquid past them to the displacer chambers, and a lever connecting said weight and displacer and together therewith being contained in the receptacle below the inlet thereto.

7. A specific gravity indicator for flowing liquids comprising a receptacle having an inlet duct leading to its top portion and flaring or increasing in area as it approaches the receptacle, and a horizontal foraminous portion below said inlet, and an outlet duct from the lower end, combined with a displacer and counterweight therefor and connected lever for said counterweight and displacer, all located in the receptacle below said foraminous portion.

8. The combination with a receptacle for a liquid the specific gravity of which is to be indicated, of a displacer and counterweight therefor and connecting lever for said counterweight and displacer, all adapted to be submerged in the liquid in the receptacle, and a pendulum connected with said lever and affording a progressively increasing resistance to the movement of the displacer in response to the buoyant effort of the liquid thereon.

9. The combination with a receptacle for a liquid, the specific gravity of which is to be indicated, of a displacer and counterweight therefor and connecting lever for said counterweight and displacer, all adapted to be submerged in the liquid in the receptacle, and a pendulum connected with said lever and affording a progressively increasing resistance to the movement of the displacer in response to the buoyant effort of the liquid thereon, and an external indicator having a pivotal axis in line with that of said lever and a magnet and armature connected with said pendulum and indicator to transmit like movement from the former to the latter.

ERVIN G. BAILEY.